US012685264B2

(12) United States Patent　　　(10) Patent No.:　US 12,685,264 B2
Carpenedo et al.　　　　　　　　　(45) Date of Patent:　　Jul. 21, 2026

(54) SUGARCANE HARVESTER WITH SHIFTABLE DISCHARGE CONVEYOR

(71) Applicant: AGCO DO BRASIL SOLUÕES AGRÍCOLAS LTDA, Ribeireo Preto (BR)

(72) Inventors: Marcelo Carpenedo, Canoas (BR); Fabio Luiz Spessoto Persoli, Canoas (BR); Andre Dias, Canoas (BR)

(73) Assignee: AGCO do Brasil Soluções Agrícolas Ltda., Ribeireo Preto (BR)

( * ) Notice: Subject to any disclaimer, the term of this patent is extended or adjusted under 35 U.S.C. 154(b) by 507 days.

(21) Appl. No.: 18/257,878

(22) PCT Filed: Oct. 12, 2021

(86) PCT No.: PCT/IB2021/059319
§ 371 (c)(1),
(2) Date: Jun. 16, 2023

(87) PCT Pub. No.: WO2022/136949
PCT Pub. Date: Jun. 30, 2022

(65) Prior Publication Data
US 2024/0107948 A1　　Apr. 4, 2024

(30) Foreign Application Priority Data
Dec. 21, 2020　(GB) ..................................... 2020263

(51) Int. Cl.
A01D 61/02　　　(2006.01)
A01D 45/10　　　(2006.01)
A01D 57/22　　　(2006.01)

(52) U.S. Cl.
CPC ............. A01D 61/02 (2013.01); A01D 45/10 (2013.01); A01D 57/22 (2013.01)

(58) Field of Classification Search
CPC ........ A01D 61/02; A01D 45/10; A01D 57/22; A01D 43/08; A01D 61/00
See application file for complete search history.

(56) References Cited

U.S. PATENT DOCUMENTS 3,307,338 A * 3/1967 Mizzi ..................... A01D 45/10
56/16.5
3,434,271 A * 3/1969 Fogels ................... A01D 45/10
56/60
(Continued)

FOREIGN PATENT DOCUMENTS

BR　　　PI0805374 A2　9/2010
BR　　　8800895 U2　10/2010
(Continued)

OTHER PUBLICATIONS

European Patent Office, International Search Report related to International Patent Application No. PCT/IB2021/059319 mail date Dec. 22, 2021, 11 pages.
(Continued)

*Primary Examiner* — Joseph M Rocca
*Assistant Examiner* — Jose Antonio Martinez

(57) ABSTRACT
A sugarcane harvester includes an improved discharge assembly that receives sugarcane billets and discharges the billets into a storage vehicle that travels alongside the harvester. The discharge assembly includes an elevator and a conveyor. The elevator lifts the billets vertically about an elevator axis that is substantially perpendicular to the longitudinal axis of the harvester. The conveyor receives the billets from the elevator and moves the billets horizontally along a conveyor axis that is substantially perpendicular to both the elevator axis and the longitudinal axis of the harvester. The discharge assembly also comprises height adjustment mechanism for vertically raising or lowering the conveyor and lateral adjustment mechanism for laterally
(Continued)

adjusting positions of the conveyor. The height adjustment mechanism and the lateral adjustment mechanism can be manually or automatically operated to shift the conveyor between a number of use positions and a transport/storage position.

15 Claims, 9 Drawing Sheets

(56)                    References Cited

U.S. PATENT DOCUMENTS

| | | | | | |
|---|---|---|---|---|---|
| 3,659,404 | A | * | 5/1972 | Kerhan | A01D 45/10 |
| | | | | | 56/13.9 |
| 3,670,481 | A | * | 6/1972 | Minet | A01D 45/10 |
| | | | | | 56/10.4 |
| 5,031,392 | A | * | 7/1991 | Baker | A01D 45/10 |
| | | | | | 460/59 |
| 5,379,578 | A | * | 1/1995 | Landry | A01D 45/10 |
| | | | | | 56/14.5 |

| | | | | | |
|---|---|---|---|---|---|
| 7,131,254 | B2 | * | 11/2006 | Flora | A01D 51/002 |
| | | | | | 56/13.1 |
| 2017/0354081 | A1 | | 12/2017 | Fattepur | |
| 2019/0230856 | A1 | * | 8/2019 | Dighton | G06V 20/56 |

FOREIGN PATENT DOCUMENTS

| | | | | | |
|---|---|---|---|---|---|
| BR | PI0900868 | A2 | 12/2010 | | |
| CN | 104488451 | B | 5/2016 | | |
| SU | 614768 | A1 | 7/1978 | | |
| WO | WO-2016201538 | A1 | * | 12/2016 | A01D 45/10 |
| WO | WO-2018064723 | A1 | * | 4/2018 | A01D 45/10 |
| WO | 2021049476 | A1 | 3/2021 | | |
| WO | 2021049562 | A1 | 3/2021 | | |

OTHER PUBLICATIONS

UK Intellectual Property Office, Search report for related UK Application No. GB2020263.6, dated May 27, 2021, 5 pages.

* cited by examiner

SUGARCANE HARVESTER WITH SHIFTABLE DISCHARGE CONVEYOR

RELATED APPLICATIONS

This application is a national stage application under 35 U.S.C. 371 of International Patent Application No. PCT/IB2021/059319, filed on Oct. 12, 2021, which claims the benefit of U.K. Application No. 2020263.6, filed Dec. 21, 2020, both of which are hereby incorporated by reference in their entirety.

BACKGROUND

Sugarcane harvesters are large, moveable, agricultural machines that harvest and partially process sugarcane. A typical sugarcane harvester cuts sugarcane stalks from sugarcane plants as it moves through the plants, strips the leaves from the sugarcane stalks, cuts the sugarcane stalks into billets, and ejects leaves, stems, and other waste material back onto the sugarcane field, where it acts as fertilizer.

Conventional sugarcane harvesters have little to no on-board storage for the sugarcane billets and therefore nearly continuously discharge the billets as the sugarcane is harvested. This is conventionally accomplished with a conveyor assembly positioned at the rear of a harvester that elevates the billets and drops them into a wagon or other storage vehicle that travels alongside the harvester. The conveyor assembly is large and bulky and extends a substantial distance behind the harvester, thus limiting the harvester's mobility and increasing the harvester's required storage space when the harvester is not in use. The conveyor assembly is only able to discharge billets at particular locations directly behind the harvester, thus requiring a wagon or other storage vehicle to closely follow and maintain particular locations relative to the harvester during harvesting.

SUMMARY

The present invention solves at least some of the above-described problems and related problems and provides a distinct advance in the art of sugarcane harvesters. More particularly, the present invention provides a sugarcane harvester with an improved discharge assembly that is compact and space efficient; that can discharge sugarcane billets in many directions and locations; and that can be quickly shifted between use positions and a transport/storage position.

A sugarcane harvester constructed in accordance with an embodiment of the invention broadly comprises an intake and cutting assembly; a chopping section; and the above mentioned discharge assembly.

The intake and cutting assembly cuts sugarcane stalks from sugarcane plants as the sugarcane harvester moves through the plants. The intake and cutting assembly may include a topper to cut off the leafy top portions of the sugarcane plants, one or more crop divider scrolls to divide and separate the sugarcane plants, one or more knockdown rollers to knock down the sugarcane plants, a base cutter assembly to sever sugarcane stalks from the sugarcane plants, and a feed section to feed the sugarcane stalks rearwardly to the chopping section.

The chopping section receives the sugarcane stalks from the intake and cutting assembly and chops or otherwise cuts the sugarcane stalks into billets. The chopping section may include or be positioned adjacent an extractor that separates leaves, stems, and other crop residue from the billets and discharges the debris back into the sugarcane field.

The discharge assembly is positioned at or near the rear of the harvester, receives the sugarcane billets from the chopping section, and discharges the billets into a wagon or other storage vehicle that travels alongside the harvester. In accordance with aspects of the present invention, the discharge assembly broadly comprises an elevator and a discharge conveyor.

The elevator receives the billets from the chopping section and lifts the billets to an elevated position. In one embodiment, the elevator lifts the billets vertically about an elevator axis that is substantially perpendicular to the longitudinal axis of the harvester. This allows the elevator to lift the billets without taking up much space behind the harvester.

The discharge conveyor receives the billets from the elevator and discharges the billets to a wagon or other storage vehicle or mechanism following the harvester. The conveyor has opposed left and right ends, a conveyor belt or other transport mechanism between the ends, and a reversible motor or other drive mechanism for moving the conveyor belt leftward or rightward with respect to the harvester for allowing the discharge of the billets on a left side or a right side of the harvester. In one embodiment, the conveyor moves the billets horizontally along a conveyor axis that is substantially perpendicular to both the elevator axis and the longitudinal axis of the harvester. This allows the conveyor to move and discharge the billets on either side of the harvester without taking up much space behind the harvester.

In accordance with another important aspect of the invention, the discharge assembly also comprises height adjustment mechanism for vertically raising or lowering the discharge conveyor. The height adjustment mechanism may simultaneously raise or lower both ends of the conveyor so as to maintain the horizontal orientation of the conveyor and to accommodate the discharge of billets into wagons or other storage vehicles of various different heights. The height adjustment mechanism may also selectively raise or lower the ends of the discharge conveyor independently of one another so the conveyor may be positioned at an angle with either end raised relative to the other end. This allows the conveyor to be positioned so as to downwardly convey the billets on either side of the harvester.

In accordance with another important aspect of the invention, the discharge assembly also comprises lateral adjustment mechanism for laterally adjusting positions of the conveyor. The lateral adjustment mechanism is operable to shift the conveyor between a leftmost position for discharging the billets on a left side of the sugarcane harvester and a rightmost position for discharging the billets on a right side of the sugarcane harvester and any positions between.

The height adjustment mechanism and lateral adjustment mechanism may be operated jointly to shift the conveyor rightward or leftward and raise one end relative to the other. For example, the lateral adjustment may shift the conveyor leftward, and the height adjustment mechanism may then lower the right end of the conveyor relative to the left end so that the left end of the conveyor extends upwardly and the right end downwardly The height adjustment mechanism and lateral adjustment mechanism may also be operated together to shift the conveyor between various use positions and a transport/storage position. In one of the use positions, the conveyor extends substantially horizontally with respect to the longitudinal axis of the harvester with its ends extending from the left and/or right sides of the harvester. When in the transport/storage position, the conveyor is angled with respect to the longitudinal axis of the harvester and neither end of the conveyor extends outside the sides of the harvester so as to occupy less space behind the harvester. The height adjustment mechanism and lateral adjustment mechanism may automatically move the conveyor to the transport/storage position whenever the harvester is not harvesting sugarcane to avoid obstacles on either side of the harvester.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures.

Figure 1:
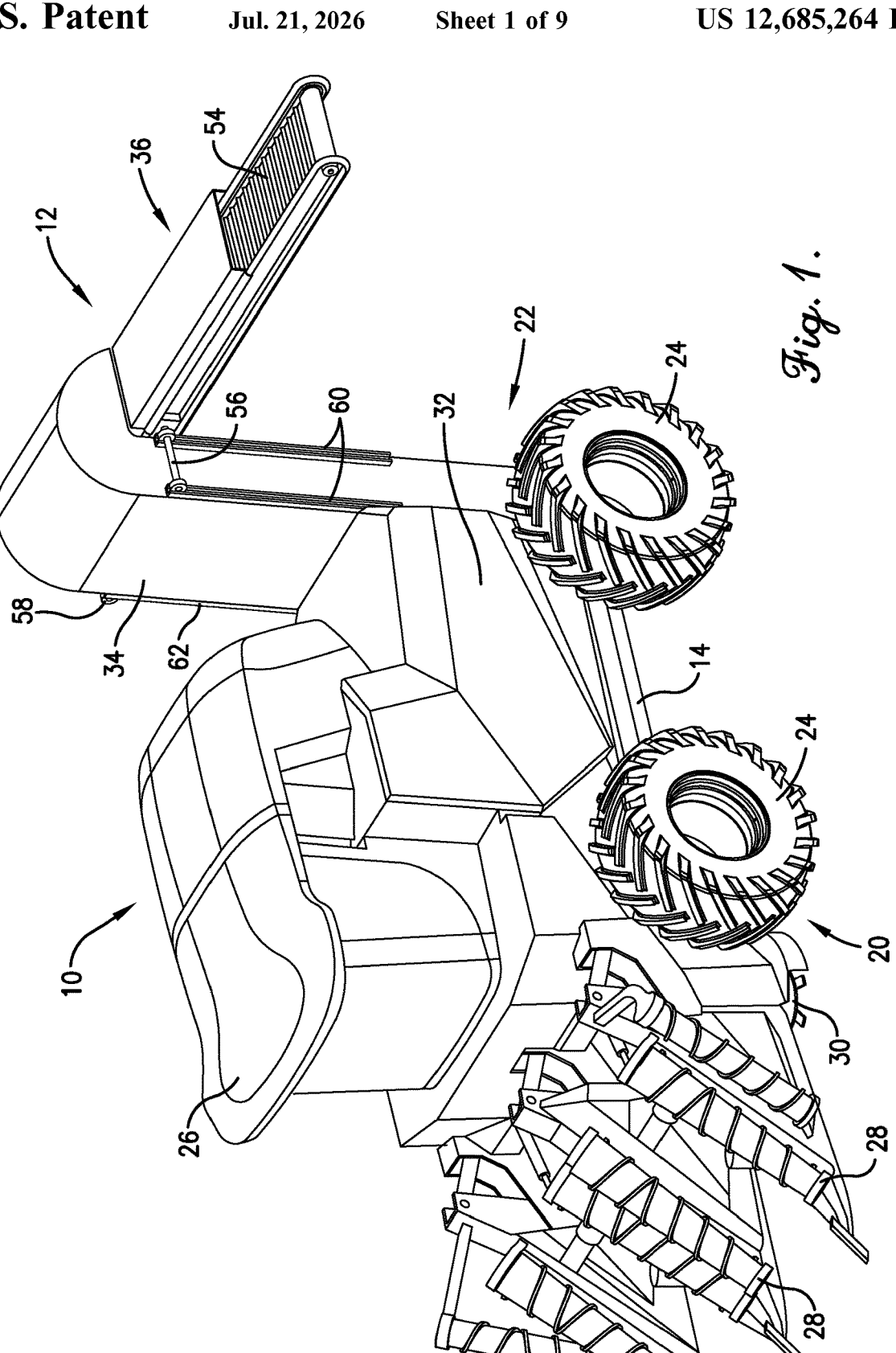
FIG. 1 is a perspective view of a sugarcane harvester constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Turning now to the drawing figures, a sugarcane harvester 10 constructed in accordance with embodiments of the invention is illustrated. As explained in more detail below, the sugarcane harvester 10 has an improved discharge assembly 12 that is compact and space efficient; that can be quickly and easily positioned and repositioned to discharge sugarcane billets in multiple different directions and locations; and that can be quickly shifted between various use positions and a transport/storage position.

An embodiment of the sugarcane harvester broadly comprises a movable chassis 14; an intake and cutting assembly 16; a chopping section 18; and the previously mentioned discharge assembly 12. Other embodiments of the sugarcane harvester 10 may have additional and/or different components.

The chassis 14 has a forward end 20 and a rearward end 22 disposed along a longitudinal axis that is essentially parallel to a ground surface over which the harvester travels. The chassis 14 rides on wheels 24, belts, or other ground-engaging traction elements that are driven by conventional motors, transmissions, and associated mechanical and electrical components. An operator's station 26 may be supported on top the chassis, although the harvester may also include various sensors and controls that provide autonomous operation without direct operator control.

The intake and cutting assembly 16 is supported on the forward end 20 of the chassis 14 for cutting sugarcane stalks from sugarcane plants as the sugarcane harvester moves through the plants. The intake and cutting assembly 16 may include a topper to cut off the leafy top portions of the sugarcane plants, one or more crop divider scrolls 28 to divide and separate the sugarcane plants, one or more knockdown rollers to knock down the sugarcane plants, one or more base cutter assemblies 30 to sever sugarcane stalks from the sugarcane plants, and a feed section to feed the sugarcane stalks rearwardly to the chopping section 18.

The chopping section 18 is supported between the forward and rearward ends of the chassis 14 and receives the sugarcane stalks from the intake and cutting assembly 16 and chops or otherwise cuts the sugarcane stalks into billets. The chopping section 18 may include or be positioned adjacent one or more extractors that separate leaves, stems, and other crop residue from the billets and discharge the debris back into the sugarcane field.

In some embodiments, the sugarcane harvester 10 also comprises an internal bin or other storage mechanism 32 supported on the chassis 14 between the chopping section 18 and the discharge assembly 12 for storing a quantity of the billets before they are discharged from the harvester. The bin may be any size and shape but is preferably small enough to fit within the side margins of the wheels 24.

The discharge assembly 12 is positioned at or near the rear of the harvester and receives the sugarcane billets from the chopping section 18 or the onboard storage bin 26 and discharges the billets into a wagon or other storage vehicle that travels alongside the harvester. In accordance with aspects of the present invention, the discharge assembly broadly comprises an elevator 34 and a discharge conveyor 36.

The elevator 34 receives the billets from the chopping section 18 (or the storage bin 32) and lifts the billets to an elevated position. In one embodiment, the elevator lifts the billets vertically about an elevator axis that is substantially perpendicular to the longitudinal axis of the harvester. This allows the elevator to lift the billets without taking up much space behind the harvester.

Figure 8:
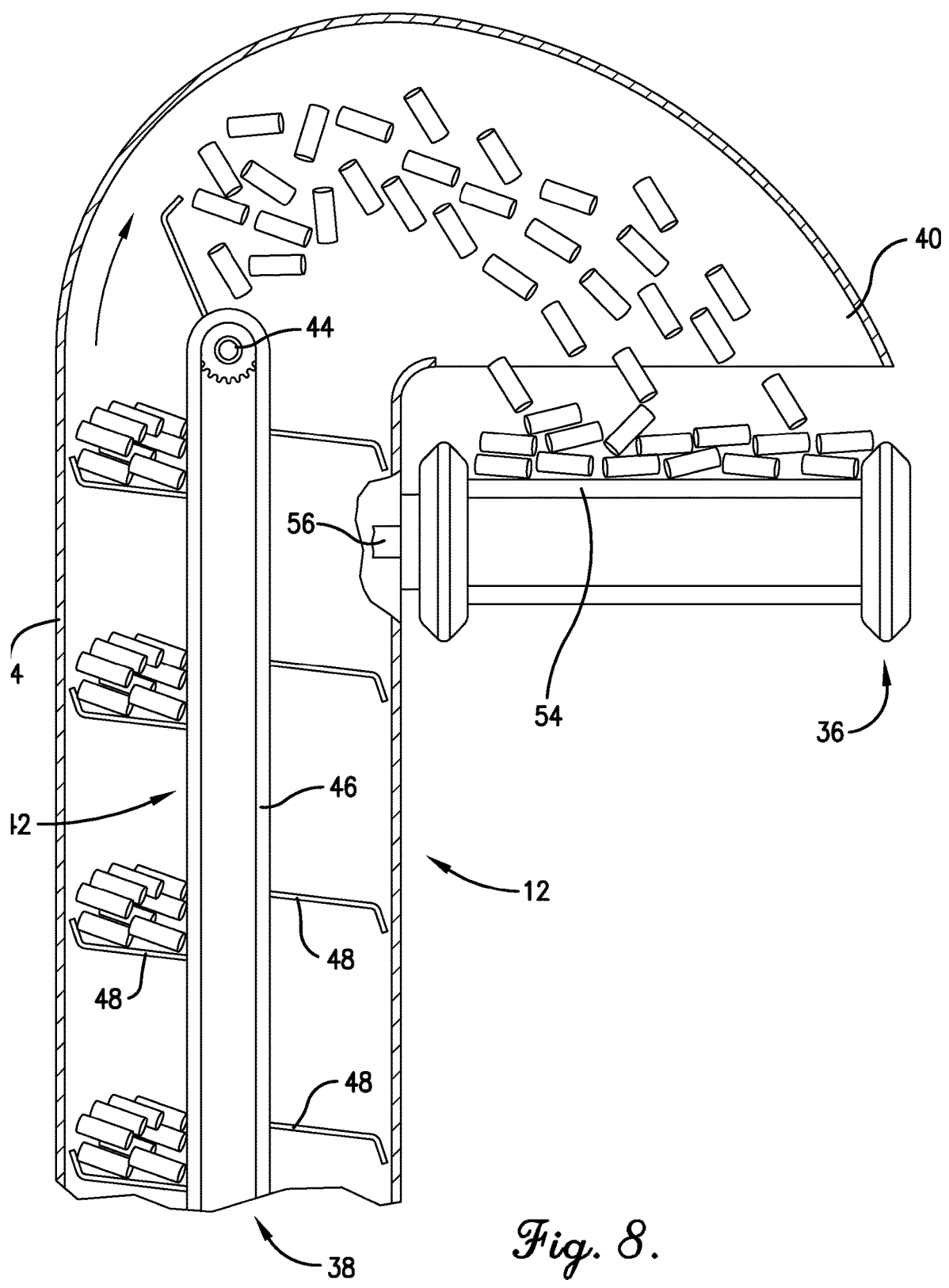
FIG. 8 is a fragmentary vertical sectional view of the elevator and the discharge conveyor of the sugarcane harvester shown discharging and conveying sugarcane billets.

As best show in FIG. 8, an embodiment of the elevator 34 includes a lower input 38, a raised output 40, and an elevating mechanism 42 that lifts the billets from the input 38 to the output 40. In one embodiment, the elevating conveying mechanism 42 includes a pair of spaced apart rollers (only the top roller 44 is shown), a continuous belt 46 trained over the rollers, a number of spaced lifting trays or arms 48 attached to the belt for supporting and lifting the billets, and a motor or other drive mechanism for driving the belt so as to move the lifting arms and billets upwardly from the input 38 to the output 40 and move the emptied lifting arms back down toward the input 38. The motor or other drive mechanism moves the conveyor at a speed sufficient to propel the billets out of the output and onto the discharge conveyor.

Figure 2:
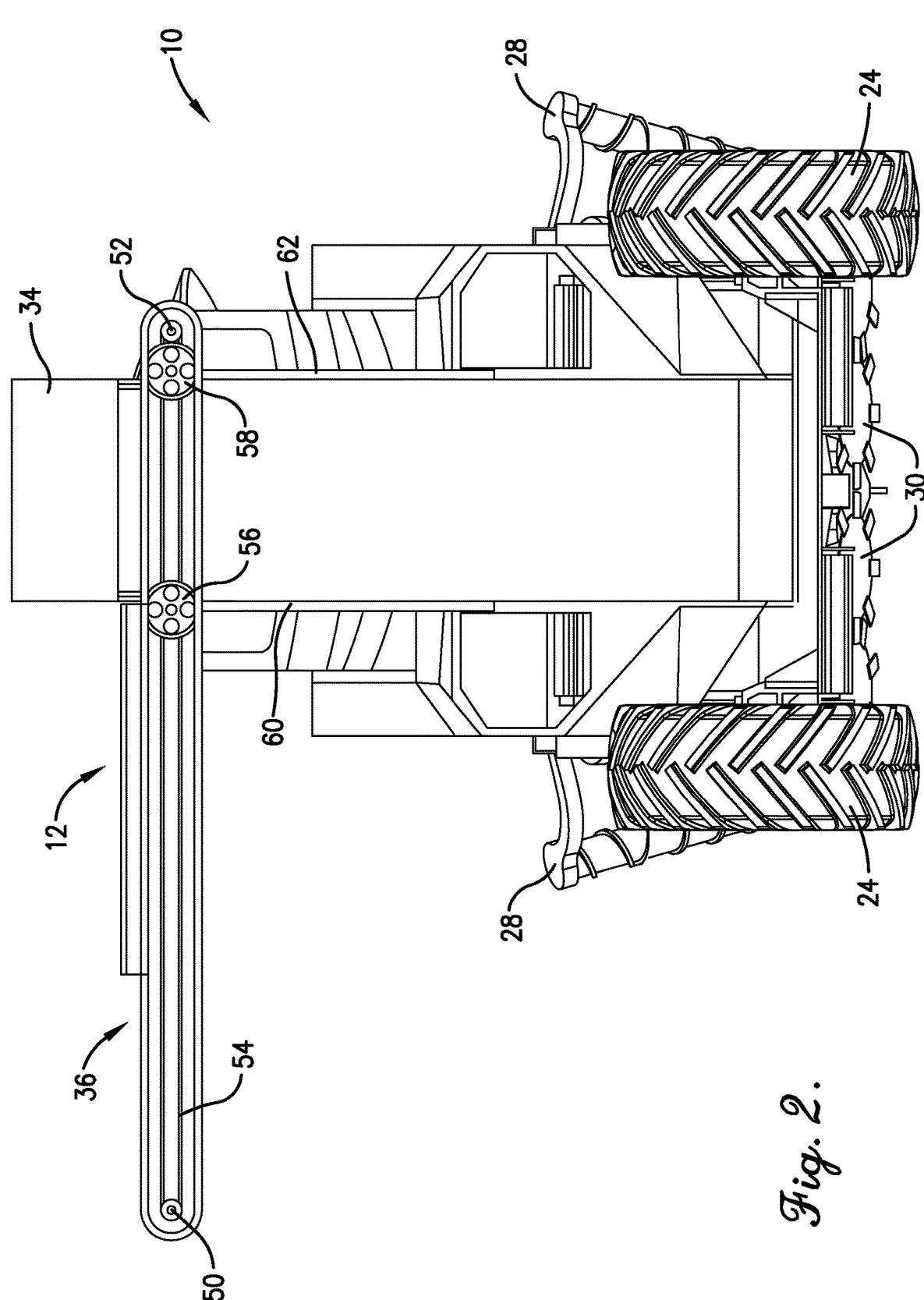
FIG. 2 is a rear view of the sugarcane harvester with its discharge conveyor shifted to its raised and leftmost position.

The discharge conveyor 36 receives the billets from the elevator 34 and discharges the billets to a wagon or other storage vehicle or mechanism following the harvester. As best shown in FIG. 2, the conveyor 36 includes a pair of spaced apart rollers 50, 52, a continuous conveyor belt 54 trained over the rollers, and a reversible motor or other drive mechanism for moving the conveyor belt leftward or rightward with respect to the harvester for allowing the discharge of the billets on a left side or a right side of the harvester. In one embodiment, the conveyor 36 moves the billets horizontally along a conveyor axis that is substantially perpendicular to both the elevator axis and the longitudinal axis of the harvester. This allows the conveyor to move and discharge the billets on either side of the harvester without taking up much space behind the harvester.

The discharge assembly 12 also comprises height adjustment mechanism for vertically raising or lowering the conveyor. The height adjustment mechanism may comprise motors, pneumatic cylinders, actuators, or any other electrical, mechanical, electromechanical, or pneumatic components capable of raising and lowering the discharge conveyor 36 relative to other components on the harvester.

An embodiment of the height adjustment mechanism comprises a pair of moveable shafts 56, 58 that are connected to the conveyor 36 and that may move within vertically extending rails 60, 62 on opposite sides of the elevator 34. The shafts 56, 58 may be moved by motors, pneumatic cylinders, actuators, or any other electrical, mechanical, electromechanical, or pneumatic components.

The height adjustment mechanism may simultaneously raise or lower both ends of the conveyor 36 so as to maintain the horizontal orientation of the conveyor. For example, the mechanism may move the conveyor 36 between an uppermost horizontal position depicted in FIGS. 1 and 2 and a lowered horizontal position depicted in FIG. 4. This permits an operator to adjust the height of the discharge conveyor 36 to accommodate the discharge of billets into wagons or other storage vehicles of various different heights.

Figure 5:
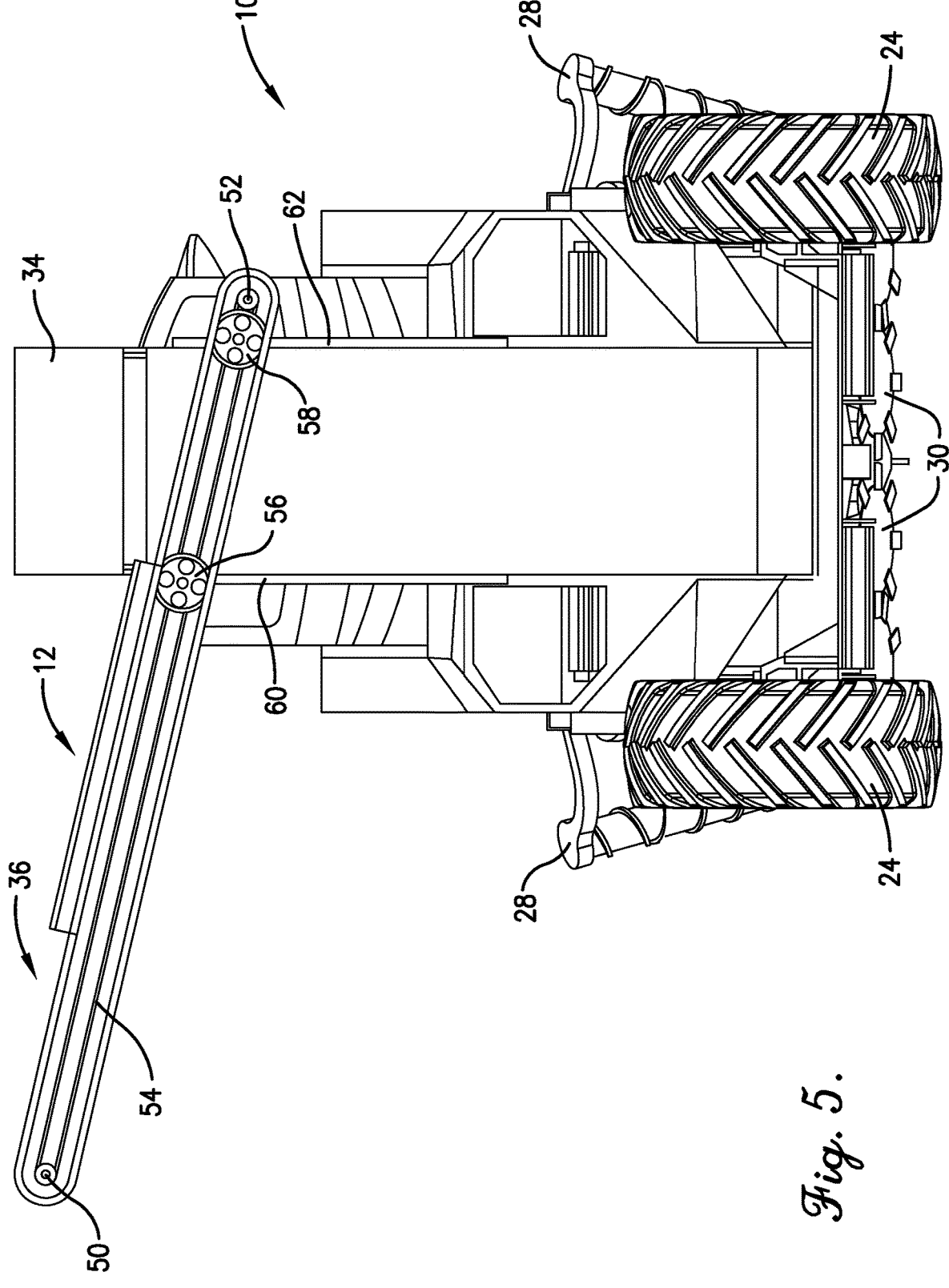
FIG. 5 is a rear view of the sugarcane harvester with its discharge conveyor shifted to its leftmost position and with its left end raised relative to its right end.
Figure 6:
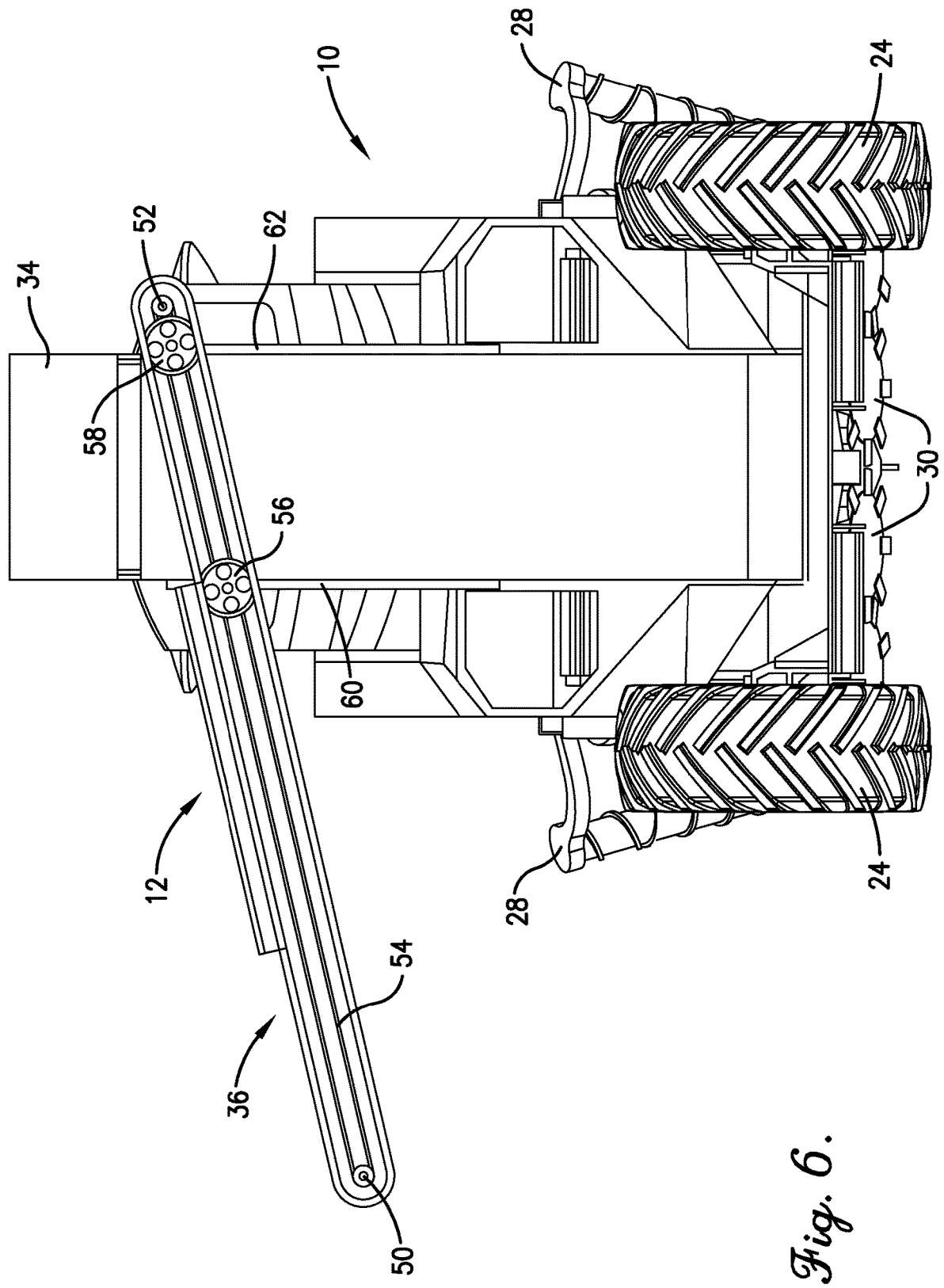
FIG. 6 is a rear view of the sugarcane harvester with its discharge conveyor shifted to its leftmost position and with its left end lowered relative to its right end.
Figure 7:
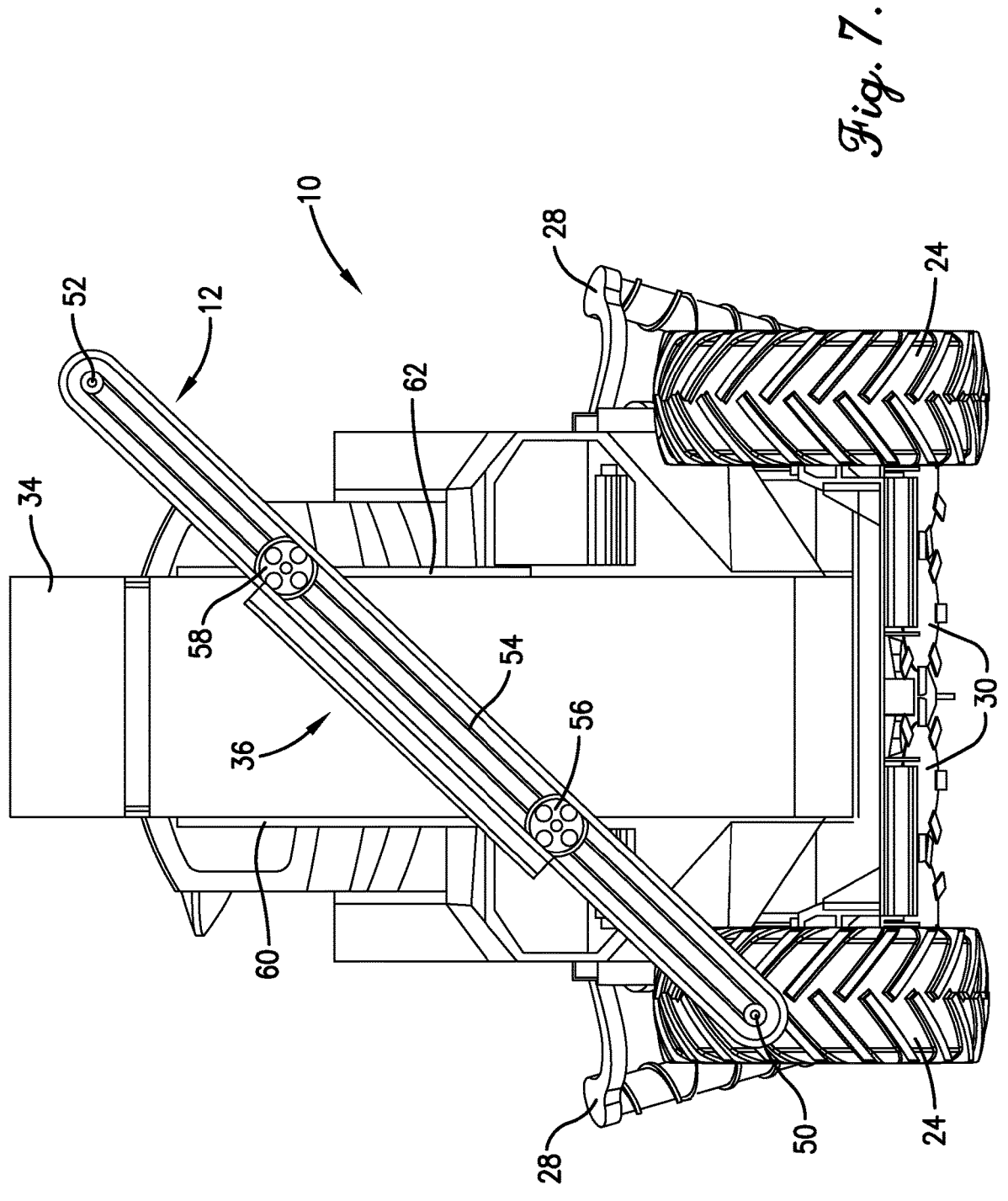
FIG. 7 is a rear view of the sugarcane harvester with its discharge conveyor shifted to a transport/storage position.

The height adjustment mechanism may also selectively raise or lower the left and right ends of the conveyor 36 independently of one another. For example, the mechanism may shift the right side shaft 58 down relative to the left side shaft 56 as depicted in FIG. 5 or shift the left side shaft down 56 relative to the right side shaft 58 as depicted in FIGS. 6 and 7. This permits an operator to adjust an angle of the conveyor 36 with respect to the ground upon which the harvester is positioned so as to convey the billets downwardly to a wagon on either side of the harvester.

The discharge assembly 12 also comprises lateral adjustment mechanism for laterally adjusting positions of the conveyor. The lateral adjustment mechanism may be part of the height adjustment mechanism or may include separate motors, pneumatic cylinders, actuators, or any other electrical, mechanical, electromechanical, or pneumatic components capable of shifting the discharge conveyor 36 right or left.

Figure 3:
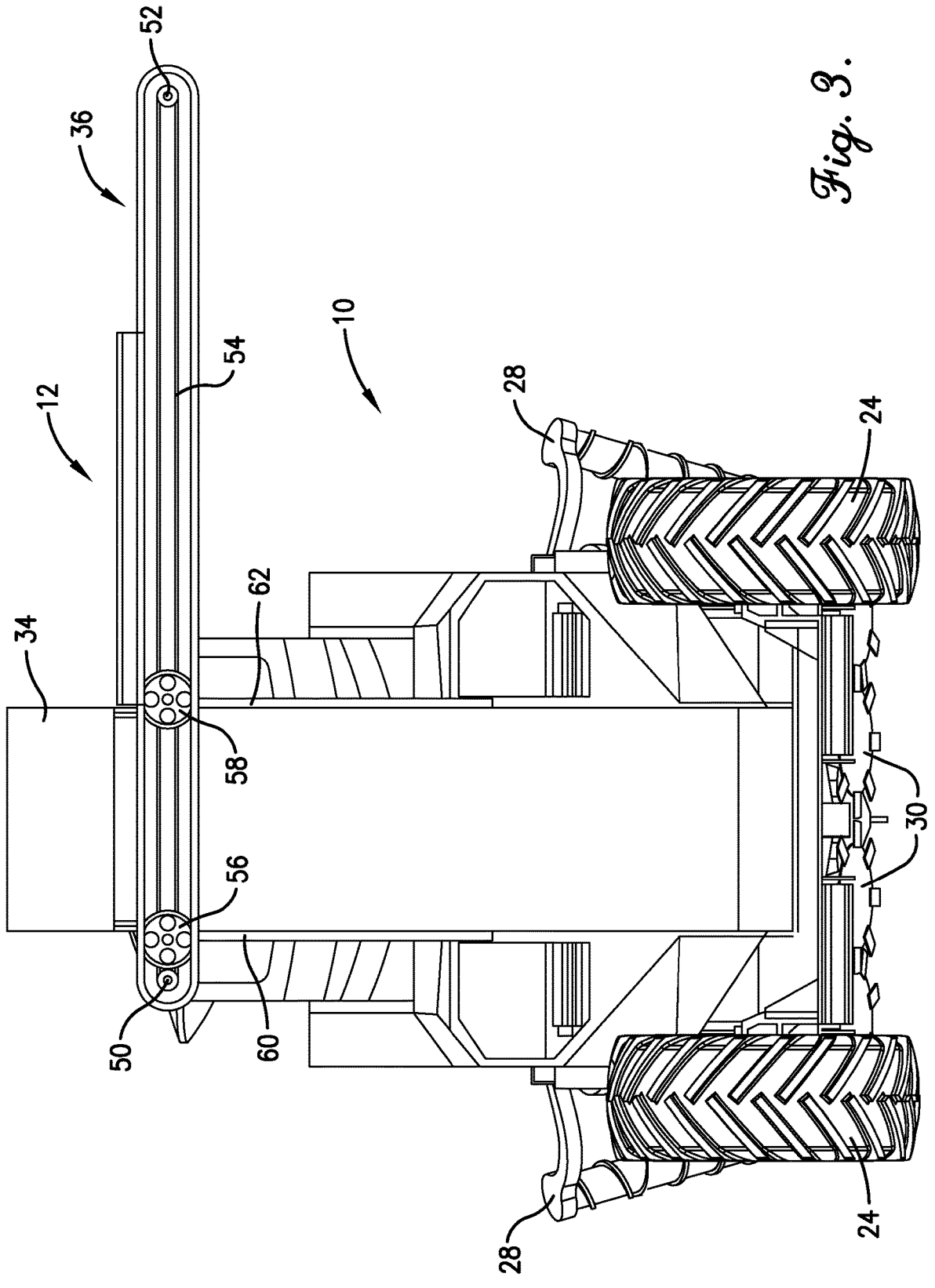
FIG. 3 is a rear view of the sugarcane harvester with its discharge conveyor shifted to its raised and rightmost position.

The lateral adjustment mechanism is operable to shift the conveyor between a leftmost position depicted in FIGS. 1, 2, 4, 5, and 6 and a rightmost position depicted in FIG. 3 and anywhere between. This permits an operator to adjust the lateral position of the discharge conveyor to discharge billets on either the left or right side of the sugarcane harvester.

The lateral adjustment mechanism and height adjustment mechanism may be operated together to first shift the conveyor rightward or leftward and then raise one end relative to the other. For example, the lateral adjustment may shift the conveyor leftward, and the height adjustment mechanism may then lower the right end of the conveyor relative to the left end so that the left end of the conveyor extends upwardly and the right end downwardly as depicted in FIG. 5.

The height adjustment mechanism and the lateral adjustment mechanism may also be cooperatively operated to shift the discharge conveyor between various use positions depicted in FIGS. 1-6 and a transport/storage position depicted in FIG. 7. When in one use position, the conveyor may extend substantially horizontally with respect to the longitudinal axis of the harvester with its ends extending from the left and right sides of the harvester as depicted in FIGS. 1-4. In other use positions, the conveyor 36 may extend at an angle with one of its ends extending beyond the sides of the rear wheels of the harvester as depicted in FIGS. 5 and 6. When in the transport/storage position, the conveyor is angled with respect to the longitudinal axis of the harvester and positioned so that both its ends are within the sides of the rear wheels of the harvester so as to occupy less space on either side of harvester.

Figure 4:
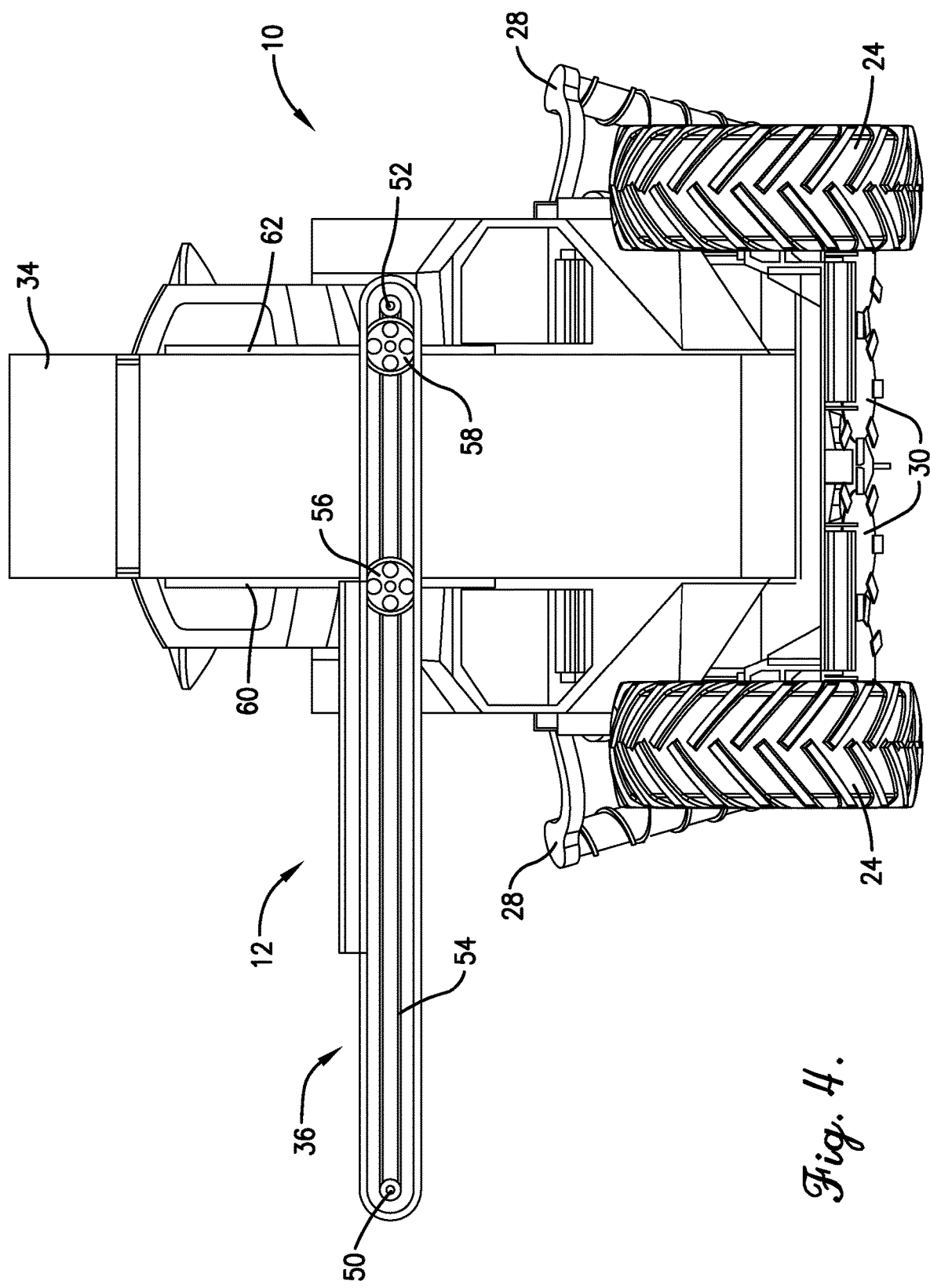
FIG. 4 is a rear view of the sugarcane harvester with its discharge conveyor shifted to a lowered and leftmost position.
Figure 9:
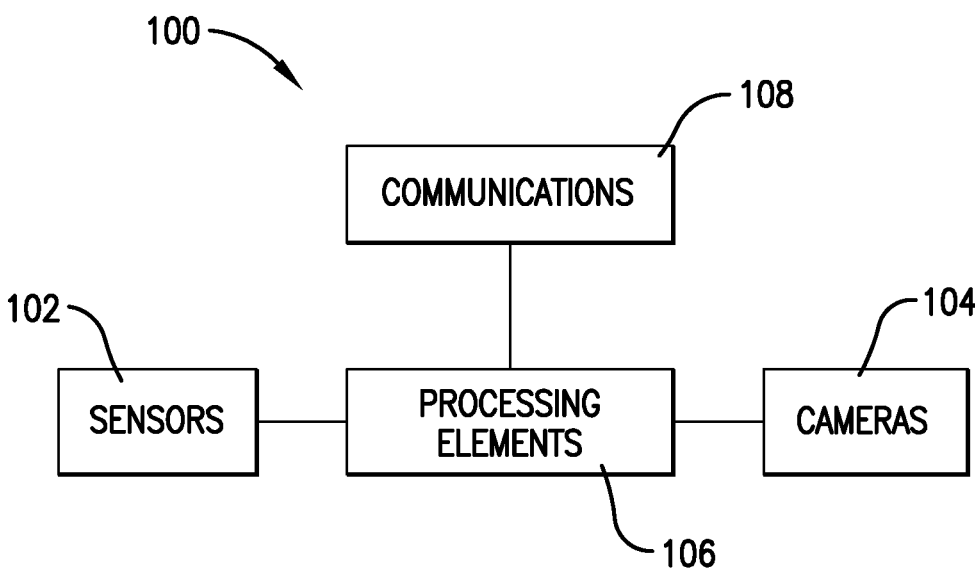
FIG. 9 is a block diagram of an exemplary control system of the sugarcane harvester.

As shown in FIG. 9, the harvester may also comprise a control system 100 for automatically controlling certain functions of the harvester including movement of the conveyor 36. The control system 100 may comprise sensors 102, cameras 104, and/or other electronic devices for sensing obstacles near the harvester such as tree limbs, fence posts, etc. and processing elements 106 for receiving data and/or signals from the sensors 102 and cameras 14 and automatically operating the height adjustment mechanism and/or the lateral adjustment mechanism in response to the received data and/or signals to prevent the discharge conveyor 36 from striking the obstacles. For example, the control system may sense a tree limb on the right side of the harvester and automatically shift the discharge conveyor 36 leftward as depicted in FIG. 2 or 4. The processing elements 106 may be programmed with logic or a number of routines, subroutines, applications, or instructions for performing the instructions described herein. The control system 100 may also comprise communication elements 108 for sending data representative of positions of the discharge conveyor 36 to remote control devices and for receiving position instructions from the remote devices to remotely adjust the positions of the discharge conveyor 36. The control system 100 may also automatically shift the conveyor 36 to its transport/storage position whenever the harvester is not harvesting sugarcane and shift the conveyor 36 to one of its use positions whenever the harvester is harvesting sugarcane. The control system 100 may also sense the position and/or size of a wagon or other storage vehicle following the harvester and automatically shift the conveyor 36 to the appropriate use position. For example, the control system may sense a wagon on its left side and automatically shift the discharge conveyor 36 to the use position depicted in FIG. 2. As another example, the control system may sense a relatively short wagon on its left side and automatically shift the discharge conveyor 36 to the use position depicted in FIG. 4.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein, such as the methods of automatically positioning the conveyor assembly 36, may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A sugarcane harvester for harvesting sugarcane stalks from sugarcane plants, the sugarcane harvester comprising:
an intake and cutting assembly for cutting the sugarcane stalks from the sugarcane plants as the sugarcane harvester moves through the sugarcane plants;
a chopping section for receiving the sugarcane stalks from the intake and cutting assembly and chopping the sugarcane stalks into billets; and
a discharge assembly comprising:
an elevator for receiving the billets from the chopping section and elevating the billets;
a conveyor for receiving the billets from the elevator, moving the billets substantially horizontally, and discharging the billets to a wagon or other storage vehicle or mechanism, wherein the conveyor has opposed right and left ends; and
an adjustment mechanism operable to shift the conveyor between a plurality of use positions and a transport/storage position, the adjustment mechanism comprising a height adjustment mechanism for vertically raising or lowering a height of the conveyor, wherein the height adjustment mechanism is operable to simultaneously raise or lower both the right and left ends of the conveyor or to selectively raise or lower the right and left ends independently of one another.

2. The sugarcane harvester as set forth in claim 1, wherein the adjustment mechanism further comprises lateral adjustment mechanism for laterally adjusting positions of the conveyor relative to the elevator.

3. The sugarcane harvester as set forth in claim 2, wherein the adjustment mechanism shifts the conveyor to one of the use positions by positioning the conveyor substantially horizontally with the right and left ends of the conveyor extending from the left and/or right sides of the harvester.

4. The sugarcane harvester as set forth in claim 2, wherein the adjustment mechanism shifts the conveyor to the transport/storage position by positioning the conveyor at an angle with respect to a longitudinal axis of the harvester and positioning the right and left ends of the conveyor such that neither the right or left end of the conveyor extends beyond a side margin of the harvester.

5. The sugarcane harvester as set forth in claim 2, wherein the lateral adjustment mechanism is operable to shift the conveyor anywhere between a leftmost position and a rightmost position.

6. The sugarcane harvester as set forth in claim 1, further comprising a moveable chassis on which the intake and cutting assembly, the chopping section, and the elevator and conveyor assembly are mounted.

7. The sugarcane harvester as set forth in claim 1, wherein the elevator elevates the billets substantially vertically.

8. The sugarcane harvester as set forth in claim 7, wherein the conveyor moves the billets in a direction substantially perpendicular to the elevator and a longitudinal axis of the sugarcane harvester.

9. A sugarcane harvester for harvesting sugarcane stalks from sugarcane plants, the sugarcane harvester comprising:
a moveable chassis having a forward end and a rearward end disposed along a longitudinal axis;
an intake and cutting assembly mounted on the forward end of the chassis for cutting the sugarcane stalks from the sugarcane plants as the sugarcane harvester moves through the sugarcane plants;
a chopping section mounted between the forward end and rearward end of the chassis for receiving the sugarcane stalks from the intake and cutting assembly and chopping the sugarcane stalks into billets; and
a discharge assembly positioned near the rearward end of the chassis, the discharge assembly comprising:
an elevator for receiving the billets from the chopping section and vertically lifting the billets about a vertical elevator axis that is substantially perpendicular to the longitudinal axis of the moveable chassis;
a conveyor for receiving the billets lifted by the elevator, moving the billets substantially horizontally about a horizontal conveyor axis that is perpendicular to both the vertical elevator axis and the longitudinal axis of the moveable chassis, and discharging the billets to a wagon or other storage vehicle or mechanism, wherein the conveyor has opposed right and left ends; and
an adjustment mechanism operable to shift the conveyor between a plurality of use positions and a transport/storage position, the adjustment mechanism comprising a height adjustment mechanism for vertically raising or lowering a height of the conveyor, wherein the height adjustment mechanism is operable to simultaneously raise or lower both the right and left ends of the conveyor or to selectively raise or lower the right and left ends independently of one another.

10. The sugarcane harvester as set forth in claim 9, wherein the adjustment mechanism further comprises lateral adjustment mechanism for laterally adjusting positions of the conveyor relative to the elevator.

11. The sugarcane harvester as set forth in claim 10, wherein the lateral adjustment mechanism is operable to shift the conveyor anywhere between a leftmost position and a rightmost position.

12. The sugarcane harvester as set forth in claim 10, wherein the adjustment mechanism shifts the conveyor to one of the use positions by positioning the conveyor substantially horizontally with the right and left ends of the conveyor extending from the left and/or right sides of the harvester.

13. The sugarcane harvester as set forth in claim 10, wherein the adjustment mechanism shifts the conveyor to the transport/storage position by positioning the conveyor at an angle with respect to a longitudinal axis of the harvester and positioning the right and left ends of the conveyor such that neither the right or left end of the conveyor extends beyond a side margin of the harvester.

14. A sugarcane harvester for harvesting sugarcane stalks from sugarcane plants, the sugarcane harvester comprising:

a moveable chassis having a forward end and a rearward end disposed along a longitudinal axis;

an intake and cutting assembly mounted on the forward end of the chassis for cutting the sugarcane stalks from the sugarcane plants as the sugarcane harvester moves through the sugarcane plants;

a chopping section mounted between the forward end and rearward end of the chassis for receiving the sugarcane stalks from the intake and cutting assembly and chopping the sugarcane stalks into billets; and a discharge assembly positioned near the rearward end of the chassis, the discharge assembly comprising:

an elevator for receiving the billets from the chopping section and vertically lifting the billets about a vertical elevator axis that is substantially perpendicular to the longitudinal axis of the moveable chassis;

a conveyor for receiving the billets lifted by the elevator, moving the billets substantially horizontally about a horizontal conveyor axis that is perpendicular to both the vertical elevator axis and the longitudinal axis of the moveable chassis, and discharging the billets to a wagon or other storage vehicle or mechanism, wherein the conveyor has opposed right and left ends;

a height adjustment mechanism for vertically raising or lowering a height of the conveyor, wherein the height adjustment mechanism is operable to simultaneously raise or lower both the right and left ends of the conveyor or to selectively raise or lower the right and left ends independently of one another; and lateral adjustment mechanism for laterally adjusting positions of the conveyor relative to the elevator;

wherein the height adjustment mechanism and the lateral adjustment mechanism are jointly operable to shift the conveyor between a plurality of use positions and a transport/storage position.

15. The sugarcane harvester as set forth in claim 14, wherein the height adjustment mechanism and the lateral adjustment mechanism shifts the conveyor to one of the use positions by positioning the conveyor substantially horizontally with the right and left ends of the conveyor extending from the left and/or right sides of the harvester and shifts the conveyor to the transport/storage position by positioning the conveyor at an angle with respect to a longitudinal axis of the harvester and positioning the right and left ends of the conveyor such that neither the right or left end of the conveyor extends beyond a side margin of the harvester.

\* \* \* \* \*